Feb. 22, 1949.   S. E. RICHESON ET AL   2,462,287
SAFETY VALVE
Filed Aug. 22, 1946
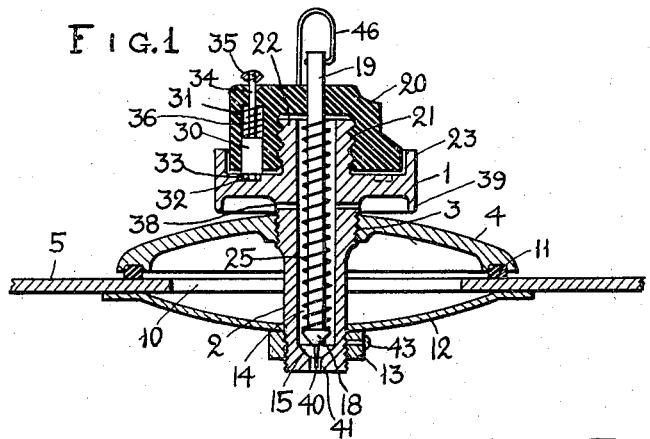
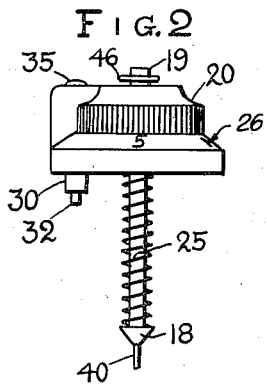
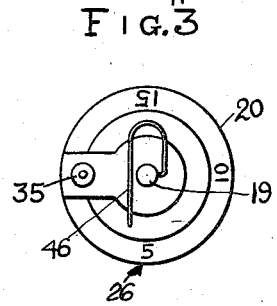
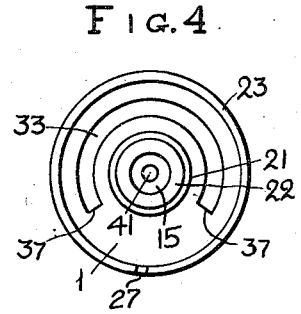
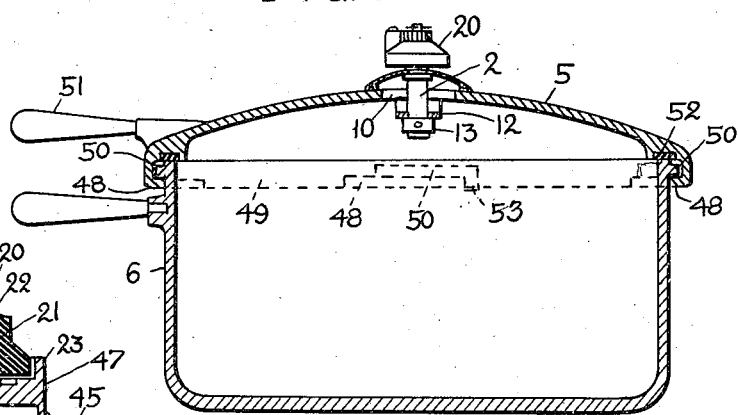
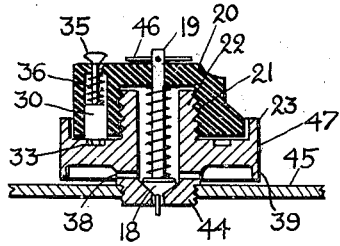
SANFORD E. RICHESON
JOSEPH A. ALLEGRO
INVENTORS
BY John P. Wilson
ATTORNEY Patented Feb. 22, 1949

2,462,287

UNITED STATES PATENT OFFICE 2,462,287

SAFETY VALVE

Sanford E. Richeson, Brooklyn, and Joseph A. Allegro, Maspeth, N. Y., assignors of one-third to Louis C. Huger, Ridgewood, N. J.

Application August 22, 1946, Serial No. 692,233

4 Claims. (Cl. 137—53)

Our invention relates to safety valves and has particular reference to safety valves for pressure cookers, particularly of the type used for home cooking food articles.

Pressure cookers are usually provided with safety valves. Because of the presence of solid matter in the food being cooked, the valves often become clogged and inoperative. To prevent the possibility of an explosion, a safety blow-out plug is also usually provided, which releases the steam when pressure rises above the blow-off pressure of the safety valve. Such blow-out plugs have a disadvantage in that they must be replaced after each operation; also that their operation results in a blast of hot steam upward from the cooker with a resultant danger of scalding attendant's face and hands. The same difficulty is often encountered with the conventional safety valves which exhaust steam directly upward.

Our invention has for its object to provide a safety valve for a pressure cooker which is so constructed that the blow-off steam escapes in a direction tangential to the cover of the cooker so that the danger of scalding one's hands or face is practically eliminated.

Another object of our invention is to provide a safety valve for a pressure cooker so constructed that it cleans itself when it is operated, by removing any obstructions which may accumulate at the intake of the valve.

Another object of our invention is to provide a safety valve which can be easily removed for cleaning or replacement but which is provided with a locking mechanism for preventing the valve from working itself loose or from being accidentally removed.

Another object of our invention is to provide a locking means for our safety valve whereby the valve can be locked in an open position, when it is desired to cook at the atmospheric pressure.

Another object of our invention is to provide a safety valve which can be readily adjusted to a desired cooking pressure.

Still another object of our invention is to provide a supplementary safety valve constructed in conjunction with the foregoing safety valve and so arranged that it opens at a pressure substantially higher than the blow-off pressure of the main safety valve, being held closed by an adjustable spring and having a relatively large opening which cannot be clogged by food particles.

The foregoing and other objects, features and advantages are more fully described in the accompanying specification and drawing in which:

Fig. 1 is a sectional elevational view of our safety valve in conjunction with supplementary safety valve, the main valve being shown in an open or inoperative position.

Fig. 2 is a detail view of the removable portion of the valve;

Fig. 3 is a top plan view of the valve removable portion;

Fig. 4 is a top plan view of the fixed portion of the valve;

Fig. 5 is a sectional elevational view of a pressure cooker with our valve shown in a reduced scale;

Fig. 6 is a sectional elevational view of a simplified valve.

Our safety valve in its form shown in Fig. 1 consists of a disc-shaped base 1 having a stem or extension 2 threaded at 3 into a convex plate 4. The latter is placed on the outer side of a cover or lid 5 of a pressure cooker 6 as shown in Fig. 5. The cap 4 covers a large opening 10 in the lid 5 and is provided with a gasket 11 made of rubber or similar material providing a steam-proof seal. The lower end of the extension 2 passes through a corresponding opening in a spring plate 12 and is tightened by a nut 13. The plate 12 is curved upward and its ends rest against the under side of the lid 5. By tightening the nut 13, the plate 12 is placed under compression, causing the plate 4 to be tightly pressed against the outer side of the lid 5.

The extension 2 of the base 1 has a central bore 14 with a tapering valve seat 15 at the lower end of valve 18. The latter has a stem 19 passing to the outside of the base 1 and sliding in a corresponding hole in a cap 20. The latter is threaded at 21 on an upper extension 22 of the base 1. The lower portion of the cap is round and is confined within upstanding flange 23 of the base 1. A helical spring 25 is placed on the stem 19 between the valve 18 and the upper portion of the cap 20. The pressure of the spring 25 determines the vapor pressure in the cooker at which the valve 18 is raised from its seat 15. This pressure can be adjusted by turning the cap 20 to the right or to the left, thereby moving the cap up or down on the threads 21. Each particular position of the cap 20 corresponds to a definite vapor pressure, which is marked on the cap by numbers 26 with reference to a stationary mark 27 on the flange 23.

To prevent accidental removal of the cap 20, it is provided with a locking plunger 30 slidably fitted in a bore 31 of the cap and provided with a pin 32 at the bottom engaging an arcuate groove 33 in the upper surface of the base 1. A stem 34 extends from the plunger and passes through a corresponding hole in the upper closed end of the bore. A nut 35 is threaded on the upper outer end of the stem 34 and relates the plunger in its place when the cap with the valve plunger is removed from the base 1 as shown in Fig. 2. A spring 36 on the stem 34 urges the plunger 30 downward. The groove 33 extends through a substantial portion of a circle so as to make it possible to adjust the position of the cap 20 to a desired vapor pressure. The groove 33 also prevents the complete unscrewing of the cap, shoulders 37 at the ends of the groove 33 engaging the pin 32.

If it is desired to remove the cap 20, it is turned to the left until the pin 32 engages the corresponding shoulder 37. The plunger 30 is then raised by taking hold of the nut 35, freeing the pin 32 from the shoulders 37 and allowing further unscrewing of the cap until it is entirely removed.

The valve 18 is provided with a pin 49 at the lower end, passing with a clearance through the bottom hole 41 in the valve seat. The pin extends beyond the end of the hole 41 so that the pin, when the valve is raised and seated again, will clear the hole 41 from any obstruction or clogging caused by solid food particles.

Blow-off holes 38 extend radially and horizontally through the walls of the extension 2 for releasing the vapors escaping through the valve. The base 1 has a depending flange 39 at the periphery for breaking the vapor flow from the holes 38 thereby protecting the attendant from the vapor.

For lowering the valve in an open position when it is desired to cook at the atmospheric pressure, a lowering hook 46 is provided at the end of the valve stem 19, one end of the hook rotatively engaging the hole at the stem. By turning the hook in a vertical position as shown in Fig. 1, the valve stem is raised, leaving the valve open. The valve is released when the hook is turned to the side as shown in Fig. 6.

Despite all precautions, however, the valve may be temporarily clogged thereby causing the vapor pressure to rise above the desired value. To prevent the possibility of an explosion, a second safety feature is provided consisting of the above described cover plate 4 and spring plate or bar 12 to which the lower end of the extension 2 is secured by the nut 13. The tension of the spring plate 12 is so adjusted that the plate will yield when the total vapor pressure on the cover plate 4 exceeds a predetermined value, usually substantially higher than the corresponding vapor pressure to which the cap 20 was set. Because of the large periphery of the cover plate 4, allowing the vapor to escape in a horizontally extending stream all along the said periphery, the pressure and the density of the vapor steam are greatly reduced, so that there will be no danger to an attendant of being scalded by the hot vapor.

The cover plate 4 with the spring plate 12 constitutes therefore a second or supplementary safety valve. The blow-off pressure of the second valve can be adjusted by the nut 13. The latter can be locked in an adjusted position by a set screw 43.

A simplified valve is shown in Fig. 6, the second valve being omitted and the extension 44 threaded directly into the cover 45 of the pressure cooker. The body 47 is otherwise made similar to the body 1. The valve can be used with any conventional or other pressure cooker such, for instance, as the cooker 6 with its lid 5. The latter has an inward extending flange 48 with slots 49 which pass over locking lugs 50 extending from the vessel 6. The lid 5 is placed over the edge of the vessel 6 with the slots 49 over the lugs 50 and then the lid 5 is turned by its handle 51 until the flange portions 48 glide under the lugs 50 until they are stopped by depending stopping lugs 53. A sealing gasket 52 provides an air tight seal for the cooker.

It will be understood that various features and principles of each om the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

The following is claimed as new:

1. A valve for a pressure cooker comprising a support; a base having an extension; means to mount the extension on said support; a cap threaded on the base; a valve seat in the base; a valve engaging the seat having a stem passing through a hole in the cap; a spring on the stem urging the valve against the seat; the cap being adapted to be manually rotated thereby changing the pressure of the spring on the valve; the base having an arcuate groove with shoulders at its ends; a plunger slidably fitted in the cap; a spring urging the plunger downward for causing the lower end of the plunger to engage the arcuate groove thereby limiting the rotational movement of the cap between the shoulders of the groove; and an exposed head on the plunger adapted to be manually moved upward for releasing the plunger from the groove thereby enabling the cap to be entirely unscrewed from the base.

2. A valve for a pressure cooker comprising a support having an opening therethrough, a base; a convex plate mounted on said support over said opening; means to mount the base on the plate; a valve in the base; an extension on the base passing through the opening; a spring plate resting on the under side of the support over the opening; and means to adjustably secure the lower end of the extension to the spring plate for regulating the pressure at which the convex plate with the base is raised above the support by pressure fluid.

3. A valve for a pressure cooker comprising a support having an opening therethrough, a base; a convex plate mounted on said support over said opening; means to mount the base on the plate; a valve in the base; an adjustable spring for urging said valve closed; an extension on the base passing through the opening; a spring plate resting on the under side of the support over the opening; and means to adjustably secure the lower end of the extension to the spring plate for regulating the pressure at which the convex plate with the base is raised above the support by pressure fluid of the spring plate being adjusted to a higher pressure for closing the convex plate than the closing pressure at which the valve spring is adjusted.

4. A valve for a pressure cooker having a vessel and a lid adapted to be tightly locked in an operative position on the vessel, the lid having an opening; a convex plate placed over the opening; a valve base secured to the convex plate; a valve in the base; a seat for the valve in the base; a spring on the valve urging the valve against the seat; means to adjust the valve spring pressure for adjusting the pressure of the vapors in the vessel at which the valve is opened; an extension on the base passing through the opening; a spring plate engaged by the extension, the ends of the spring plate engaging the under side of the lid over the opening; and means to adjust the pressure of the spring plate for regulating the pressure at which the spring plate yields and releases the convex plate to be raised thereby allowing the vapors to escape.

SANFORD E. RICHESON.
JOSEPH A. ALLEGRO.

REFERENCES CITED

The following references are of record in the file of this patent:

UNITED STATES PATENTS

| Number | Name | Date |
| --- | --- | --- |
| 1,189,173 | Petersen | June 27, 1916 |
| 1,328,653 | Ferris | June 20, 1920 |

Certificate of Correction

Patent No. 2,462,287. February 22, 1949.

SANFORD E. RICHESON ET AL.

It is hereby certified that error appears in the above numbered patent requiring correction as follows:

In the heading to the printed specification, line 5, name of assignee, for "Louis C. Huger" read *Louis C. Huber*; and that the said Letters Patent should be read with this correction therein that the same may conform to the record of the case in the Patent Office.

Signed and sealed this 28th day of June, A. D. 1949.

[SEAL]

THOMAS F. MURPHY,
*Assistant Commissioner of Patents.*